United States Patent
Rosen et al.

(10) Patent No.: US 6,956,135 B2
(45) Date of Patent: Oct. 18, 2005

(54) MONOFUNCTIONAL POLYETHYLENE GLYCOL ALDEHYDES

(75) Inventors: Perry Rosen, Seattle, WA (US); Kwang H. Nho, Orinda, CA (US)

(73) Assignee: Sun Bio, Inc., Walnut Creek, CA (US)

( * ) Notice: Subject to any disclaimer, the term of this patent is extended or adjusted under 35 U.S.C. 154(b) by 152 days.

(21) Appl. No.: 10/661,268

(22) Filed: Sep. 12, 2003

(65) Prior Publication Data

US 2004/0122164 A1 Jun. 24, 2004

Related U.S. Application Data

(63) Continuation-in-part of application No. 10/431,294, filed on May 7, 2003, which is a continuation-in-part of application No. 10/303,260, filed on Nov. 25, 2002, now abandoned.
(60) Provisional application No. 60/407,741, filed on Sep. 3, 2002, provisional application No. 60/381,503, filed on May 17, 2002, and provisional application No. 60/348,452, filed on Jan. 6, 2002.

(30) Foreign Application Priority Data

Dec. 11, 2001 (KR) ................................. 10-2001-0078244

(51) Int. Cl.$^7$ ........................ C07C 47/02; C08G 63/48; C07K 16/00
(52) U.S. Cl. ................... 568/497; 525/54.1; 525/54.2; 525/398; 525/403; 530/391.9
(58) Field of Search ................. 568/497; 525/54.1, 525/54.2, 398, 403; 530/391.9

(56) References Cited

U.S. PATENT DOCUMENTS

| | | |
|---|---|---|
| 4,528,334 A | 7/1985 | Knopf et al. ............... 425/404 |
| 5,135,683 A | 8/1992 | Cooper |
| 5,252,714 A | 10/1993 | Harris et al. ............. 530/291.9 |
| 5,539,063 A | 7/1996 | Hakimi et al. ............... 525/403 |
| 5,990,237 A | 11/1999 | Bentley et al. ............. 525/54.2 |
| 6,437,025 B1 | 8/2002 | Harris et al. ................ 523/406 |
| 6,465,694 B1 | 10/2002 | Baudys et al. .............. 568/494 |
| 6,541,543 B2 | 4/2003 | Harris et al. ................ 523/406 |

FOREIGN PATENT DOCUMENTS

| | | |
|---|---|---|
| WO | WO 02/059179 | 8/2002 |
| WO | WO 03/044056 | 5/2003 |

OTHER PUBLICATIONS

Vandoorne et al., "Functionalization of α–hydrogen–ω–methoxypoly(oxyethylene),1 A new method for the conversion of hydroxyl end groups into aldehyde groups," *Makromol. Chem., Rapid Commun.*, 10:271–275 (1989).

Nathan et al., "Copolymers of Lysine and Polyethylene Glycol: A New Family of Functionalized Drug Carriers," *Bioconjugate Chem.*, 4:54–62 (1993).

*Primary Examiner*—Johann Richter
*Assistant Examiner*—Sikarl A. Witherspoon
(74) *Attorney, Agent, or Firm*—Gibbons, Del Deo, Dolan, Griffinger + Vecchione

(57) ABSTRACT

The present invention provides novel monofunctional polyethylene glycol aldehydes for the pegylation of therapeutically active proteins. The pegylated protein conjugates that are produced, retain a substantial portion of their therapeutic activity and are less immunogenic than the protein from which the conjugate is derived. New syntheses for preparing such aldehydes are described.

8 Claims, No Drawings

MONOFUNCTIONAL POLYETHYLENE GLYCOL ALDEHYDES

CROSS REFERENCE TO RELATED APPLICATIONS

The priority of Korean Application No. 10-2001-0078244, filed Dec. 11, 2001, as well as U.S. Ser. No. 60/348,452, filed Jan. 6, 2002, U.S. Ser. No. 60/381,503, filed May 17, 2002 and U.S. Ser. No. 60/407,741, filed Sep. 3, 2002, U.S. Ser. No. 10/303,260, filed Nov. 25, 2002 and U.S. Ser. No. 10/431,294, filed May 7, 2003 are claimed. This Application is a Continuation-In-Part of U.S. Ser. No. 10/431,294, filed May 7, 2003 which is a Continuation-In-Part of U.S. Ser. No. 10/303,260, filed Nov. 25, 2002 now abandoned.

BACKGROUND

Therapeutic proteins which are generally administered by intravenous injection may be immunogenic, relatively water insoluble, and may have a short in vivo half-life. The pharmacokinetics of the particular protein will govern both the efficacy and duration of effect of the drug. It has become of major importance to reduce the rate of clearance of the protein so that prolonged action can be achieved. This may be accomplished by avoiding or inhibiting glomerular filtration which can be effected both by the charge on the protein and its molecular size (Brenner et al., (1978) Am. J. Physiol., 234, F455). By increasing the molecular volume and by masking potential epitope sites, modification of a therapeutic polypeptide with a polymer such as polyethylene glycol (PEG) has been shown to be efficacious in reducing both the rate of clearance as well as the antigenicity of the protein. Reduced proteolysis, increased water solubility, reduced renal clearance, and steric hindrance to receptor-mediated clearance are a number of mechanisms by which the attachment of a PEG polymer to the backbone of a polypeptide may prove beneficial in enhancing the pharmacokinetic properties of the drug. Thus Davis et al., U.S. Pat. No. 4,129,337 discloses conjugating PEG to proteins such as enzymes and insulin to produce a less immunogenic product while retaining a substantial proportion of the biological activity.

PEG modification requires activation of the PEG polymer that is accomplished by the introduction of an electrophilic center. The PEG reagent is now susceptible to nucleophilic attack, predominantly by the nucleophilic epsilon-amino group of a lysyl residue. Because of the number of surface lysines present in most proteins, the PEGylation process can result in random attachments leading to mixtures which are difficult to purify and which may not be desirable for pharmaceutical use.

There are a large variety of PEG reagents that have been developed for the modification of proteins. This involves the covalent attachment of a PEG molecule via the formation of a linking group between the PEG polymer and the protein (see for example Zalipsky, et al., and Harris et. al., in: Poly(ethylene glycol) Chemistry: Biotechnical and Biomedical Applications; (J. M. Harris ed.) Plenum Press: New York, 1992; Chap. 21 and 22). Some of these reagents are, to various degrees, unstable in the aqueous medium in which the PEGylation reaction occurs. In addition, the conjugation process often results in the loss of in vitro biological activity that is due to several factors foremost of which being a steric interaction with the proteins active sites. A desired property therefore of a new reagent would be one that is not susceptible to degradation in an aqueous medium and one that may be employed to affect the site specific modification of a protein. A PEG aldehyde may be considered such a reagent. For site specific N-terminal pegylation see Pepinsky et al., (2001) JPET, 297, 1059 (Interferon-□-1a) and U.S. Pat. No. 5,824,784 (1998) to Kinstler et al., (G-CSF). The use of a PEG-aldehyde for the reductive amination of a protein utilizing other available nucleophilic amino groups, is described in U.S. Pat. No. 4,002,531 (1977) to Royer, in EP O 154 316, by Wieder et al., (1979) J. Biol. Chem. 254, 12579, and Chamow et al., (1994) Bioconjugate Chem. 5, 133.

SUMMARY OF INVENTION

In accordance with this invention, it has been discovered that aldehydes of the formula:

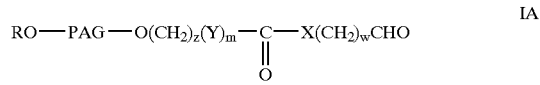

IA wherein R is hydrogen or lower alkyl, X and Y are individually selected from —O— or —NH— with the proviso that X is NH when m is 1 and Y is —O—, PAG is a divalent residue of polyalkylene glycol resulting from removal of the terminal hydroxy groups, having a molecular weight of from 1,000 to 100,000 Daltons, z is an integer of from 2 to 4, m is an integer of from 0 to 1, and w is an integer of from 2 to 8.

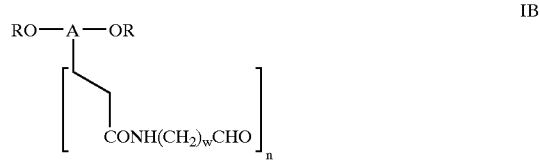

IB wherein A is a polyethylene glycol residue with its two terminal hydroxy groups being removed having a molecular weight of from 1,000 to 100,000 Daltons and having a valence of from 1 to 5, n is an integer of from 1 to 5 which integer is the same as the valence of A, R and w are as above.

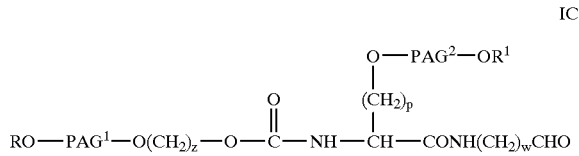

IC wherein $PAG^1$ and $PAG^2$ are independently divalent residues of poly lower alkylene glycol resulting from removal of the two terminal hydroxy groups with the $PAG^1$ and $PAG^2$ residues having a combined molecular weight of from 1,000 to 100,000 Daltons, R and $R^1$ are individually lower alkyl or hydrogen, p is an integer of from 1 to 5, z and w are as above.

are useful for conjugation to therapeutically active proteins to produce PAG protein conjugates which retain a substantial portion of their therapeutic activity and are less immunogenic than the protein from which the conjugate is derived.

In accordance with another embodiment of this invention there are included compounds of formula IA where m is 0 and z is 1. These compounds have the same use as and can be prepared in the same manner as disclosed for compounds in formula IA.

In accordance with this invention, a new synthesis has been found for the aldehyde of formula:

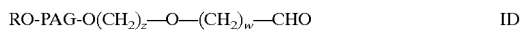

RO-PAG-O(CH$_2$)$_z$—O—(CH$_2$)$_w$—CHO    ID wherein R, PAG, and w and z are as above.
which like the compounds of formula IA, IB and IC, is a reagent for producing PAG protein conjugates.

DETAILED DESCRIPTION

The aldehyde reagents of formula IA, IB, IC and ID can be conjugated to therapeutically active proteins to produce therapeutically active protein conjugates which retain a substantial portion of the biological activity of the protein from which they are derived. In addition, the reagents of this invention are not susceptible to degradation in the aqueous medium in which the pegylation reaction is carried out. Furthermore, the aldehyde reagents of this invention can be conjugated to the protein in a controlled manner at the N-terminus. In this way, these aldehydes produce the desired conjugates and avoid random attachment leading to mixtures that are difficult to purify and which may not be desirable for pharmaceutical use. This is extremely advantageous since not only are the purification procedures expensive and time consuming but they may cause the protein to be denatured and thus bring about an irreversible change in the proteins tertiary structure.

The therapeutic proteins which can be conjugated in accordance with this invention can be any of the conventional therapeutic proteins. Among the preferred proteins are included interferon-alpha, interferon-beta, consensus interferon, G-CSF, GM-CSF, EPO, hemoglobin, interleukins, colony stimulating factor, as well as immunoglobulins such as IgG, IgE, IgM, IgA, IgD and fragments thereof.

The term polyalkylene glycol designates poly(lower alkylene)glycol radicals where the alkylene radical is a straight or branched chain radical containing from 2 to 7 carbon atoms. The term "lower alkylene" designates a straight or branched chain divalent alkylene radical containing from 2 to 7 carbon atoms such as polyethylene, polypropylene, poly n-butylene, and polyisobutylene as well as polyalkylene glycols formed from mixed alkylene glycols such as polymers containing a mixture of polyethylene and polypropylene radicals and polymers containing a mixture of polyisopropylene, polyethylene and polyisobutylene radicals. The branched chain alkylene glycol radicals provide the lower alkyl groups in the polymer chain of from 2 to 4 carbon atoms depending on the number of carbon atoms contained in the straight chain of the alkylene group so that the total number of carbons atoms of any alkylene moiety which makes up the polyalkylene glycol substituent is from 2 to 7. The term "lower alkyl" includes lower alkyl groups containing from 1 to 7 carbon atoms, preferably from 1 to 4 carbon atoms, such as methyl, ethyl, propyl, isopropyl, etc. with methyl being especially preferred.

In accordance with a preferred embodiment of this invention, PAG in the compounds in formulas IA, IC and ID is a polyethylene glycol residue formed by removal of the two terminal hydroxy groups. Further, in accordance with this invention, in the compounds of formula IA, IC and ID, and the A in the compound of formula IB, PAG may have a molecular weight of from about 10,000 to 50,000 most preferably from about 20,000 to about 40,000. In the compound of formula IC it is generally preferred that the radicals PAG$^1$ and PAG$^2$ have a combined molecular weight of from about 10,000 to 50,000 and most preferably from about 20,000 to 40,000. In the compound of formula IC it is generally preferred that p be an integer of from 1 to 5.

The aldehydes of compounds of formula IA, IB, IC and ID are used in forming polyalkyleneoxy protein conjugates. The aldehydes of this invention are intermediates for conjugation with the terminal amino group as well as other free amino groups on the protein to produce a therapeutically effective conjugate that has the therapeutic properties of the native protein. These conjugates when compared to the proteins from which they are derived, are less susceptible to renal and receptor-mediated clearance, show decreased antigenicity, diminished in vivo proteolysis, and increased water solubility. All of these factors can help make the conjugate a more effective therapeutic agent than the unmodified protein itself. The aldehydes of this invention are converted to their protein conjugates in accordance with the following reaction scheme:

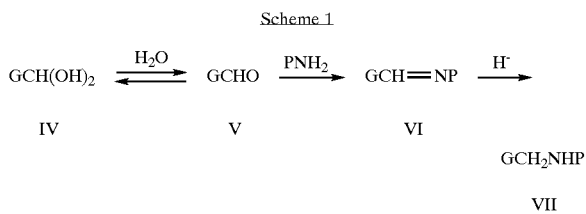

Scheme 1 wherein PNH$_2$ is a protein covalently attached to a PEG via a nucleophilic amino group of the protein.

In this reaction scheme, GCHO in the compound of formula V is a composite of the compounds of IA, IB, IC and ID showing the reactive aldehyde group. In the compound of formula IB, the number of aldehyde groups are in accordance with the valence "n". If "n" were 4, the reaction in this scheme will take place at four different sites in the compound of formula V. In this reaction scheme, P is the protein containing a nucleophilic —NH$_2$ group that is conjugated with the compounds of formula IA, IB, IC and ID.

As is illustrated in the above reaction scheme, there is an equilibrium that is established between the aldehyde V and its conventional hydrate IV. This equilibrium is pH dependent, and consequently the concentrations found for the aldehyde V and its hydrate IV, will depend largely on the particular acidity of the solution. The polyalkylene aldehyde of formula V, is reacted with the amine of the protein to form the imine linkage of formula VI. This imine linkage of the compound of formula VI is then reduced to an amine through the use of reducing agents such as cyanoborohydride to give the saturated conjugated protein of formula VII. The reaction whereby aldehydes are conjugated with proteins through reductive amination is set forth in U.S. Pat. No. 4,002,531, EPO 154,316 and U.S. Pat. No. 5,824,784.

In reacting the compound of formula V with $PNH_2$, one can control this reaction so that the aldehydes of formula IA, IB, IC and ID only react at a single site located at the N-terminus amine on the protein. This can be done by carrying out the reaction of the compound of formula V with $PNH_2$ at a pH of from 5.5 to 7.5. In carrying out this reaction, various buffers which maintain the reaction media at a pH of from 5.5 to 7.5 can be used. If one wants the amination to proceed on more than one amino site on the protein, then one carries out the reaction at a pH of 8.0 and above, preferably at a pH of from 8 to 10. In this manner, amino groups, as well as, the N-terminal amino group on the protein are aminated with the PAG aldehydes of this invention.

The specific PEGylating reagents of formula IA, IB, IC and ID of this invention, are stable in aqueous medium and are not subject to limiting aldol decompositions under the conditions of the reductive amination reaction. The amino groups on proteins such as those on the lysine residues are the predominate nucleophilic centers for the condensation of the aldehydes of this invention. However by controlling the pH of the reaction one can produce a site specific introduction of a polyalkylene glycol polymer on the protein at the desired N-terminus amino acid. When the compounds of formula IA are conjugated to a protein as is shown in Scheme 1, the resulting compound is:

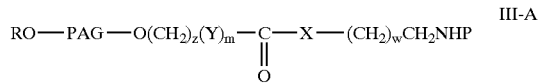

III-A wherein R, P, Y, PAG, X, m, w and z are as above.

When the compound in formula IB is conjugated to a protein as is shown in

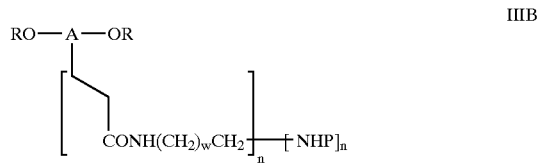

IIIB

Scheme 1, the resulting compound is:
wherein A, P, n and w are as above.

When the compound of formula IC is conjugated to a protein as is shown in Scheme 1, the resulting compound is:

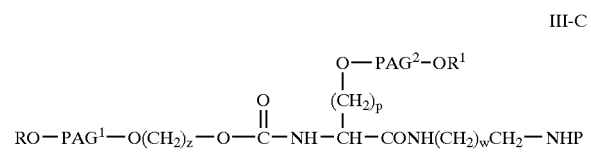

III-C wherein R, $R^1$, P, $PAG^1$, $PAG^2$, p, and w are as above, z is an

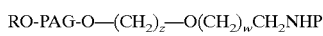

integer of from 2 to 4.

When the compound of formula ID is conjugated with the protein as is shown in Scheme 1 the resulting compound is:
III-D
wherein R, PAG, P, and w are as above, and z is an integer of from 2 to 4.

In accordance with this invention, in formula IA, when m is 0 and X is —NH—, these compounds have the formula:

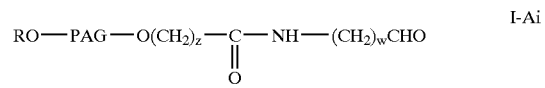

I-Ai wherein R, PAG, and w are as above, and z is an integer of from 1 to 4

The compound of formula I-Ai can be prepared as described by the following reaction scheme:

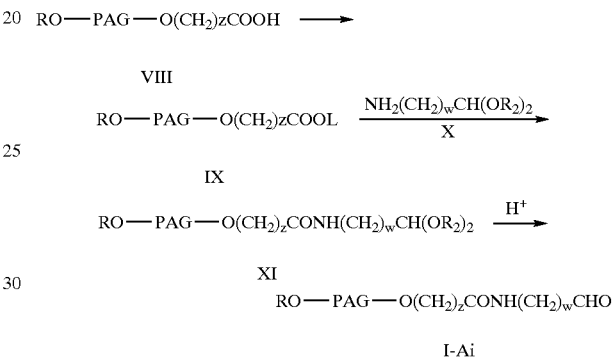

I-Ai wherein R, PAG, z and w are as above, $R_2$ is lower alkyl, and OL is a leaving group.

In the first step of the reaction to produce the compound of formula I-Ai, the acid group of the compound in formula VIII is converted into an active ester of formula IX. Any conventional method of activating a carboxylic acid by formation of an active ester such as a pentafluorophenyl ester, can be utilized to produce the compound of formula IX. In the next step of the synthesis, the compound of formula IX containing the activating leaving group is reacted with the amine acetal compound of formula X to produce the compound of formula XI. This reaction to form the amide of formula XI is carried out by any conventional means of condensing an amine with an activated carboxylic acid group. The compound of formula XI has the aldehyde protected as its acetal, preferably a lower alkyl acetal. Any conventional aldehyde protecting groups such as other alkyl acetals can also be utilized. The acetal of formula XI can be hydrolyzed to form the corresponding aldehyde of formula I-Ai. Any conventional means of hydrolyzing an acetal to form the corresponding aldehyde can be utilized to convert the compound of formula XI into the corresponding aldehyde of formula I-Ai.

In accordance with an other embodiment of preparing a compound of the formula I-Ai, the acetal of formula X is replaced with a dioxolane of the formula Xa that is reacted with compound IX to produce the intermediate of XIa. Compound XIa is then hydrolyzed to the corresponding vicinal diol XIb and then oxidized with periodate to produce the aldehyde of formula I-Ai.

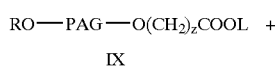

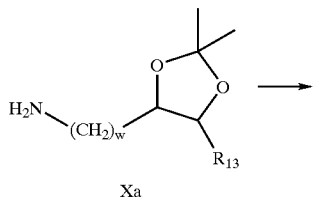

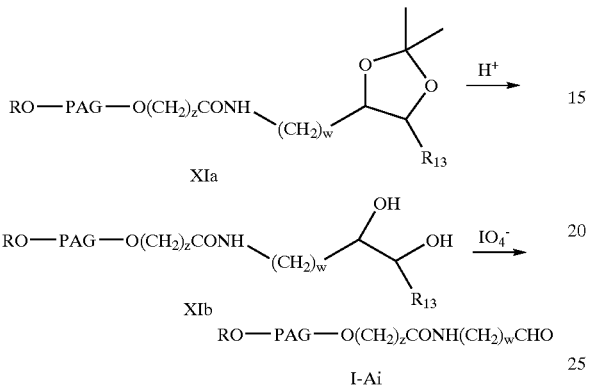

wherein R, PAG, z and w are as above, OL is a leaving group, and $R_{13}$ is hydrogen, alkyl, or phenyl.

In the compound of formula IA where m is 1, X is —NH— and Y is —O—, this compound has the formula:

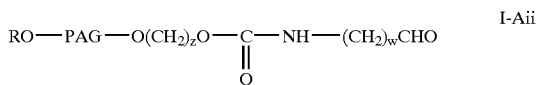

wherein R, PAG, and w are as above, and z is an integer of from 2 to 4

The compound of formula I-Aii can be prepared as described by the following reaction scheme:

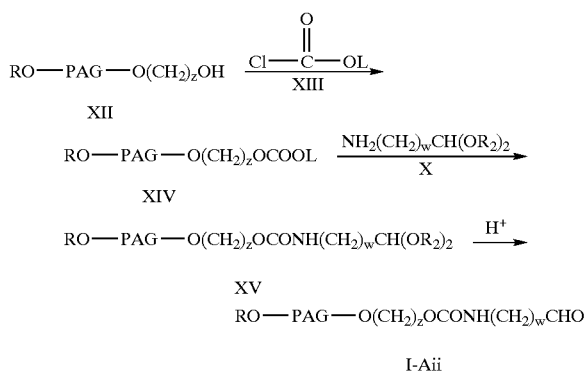

wherein OL, R, $R_2$, PAG, z and w are as above.

In the above reaction scheme the compound of formula XII is first reacted with a compound of formula XIII which is a halo formate containing a leaving group. Any conventional leaving group can be utilized as OL such as the leaving groups herein before mentioned. The preferred leaving group is a para-nitro phenol radical. One can utilize any of the conventional conditions for reacting an alcohol such as the compound of formula XII with a chloro formate such as the compound of formula XIII to produce the carbonate of formula XIV. The carbonate is then reacted with the amine of formula X to produce the compound of formula XV. This reaction is carried out as described hereinbefore with regard to reacting the compound of formula IX with the compound of formula X. The compound of formula XV is then hydrolyzed to produce the compound of formula I-Aii in the conventional manner as described in connection with the hydrolysis of the compound of formula XI hereinbefore.

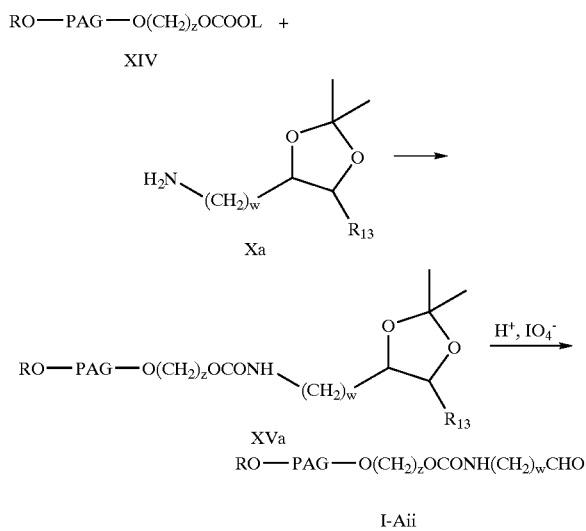

In the same manner described in the alternate synthesis of I-Ai, the compound of formula Xa is reacted with the carbonate XIV to produce the compound of formula XVa which is then hydrolyzed and oxidized to give the aldehyde I-Aii.

wherein R, PAG, z and w are as above, OL is a leaving group, and $R_{13}$ is hydrogen, alkyl, or phenyl.

In accordance with another embodiment of this invention wherein the compound of formula IA, m is 1 and Y and X are both —NH—, this compound has the formula:

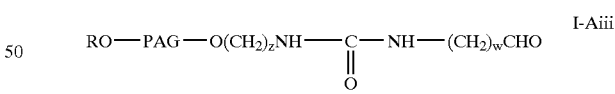

wherein R, PAG, and w are as above, and z is an integer of from 2 to 4.

The compound of formula I-Aiii can be prepared as described by the following reaction scheme:

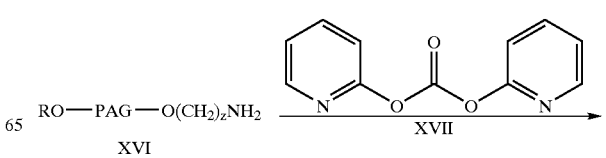

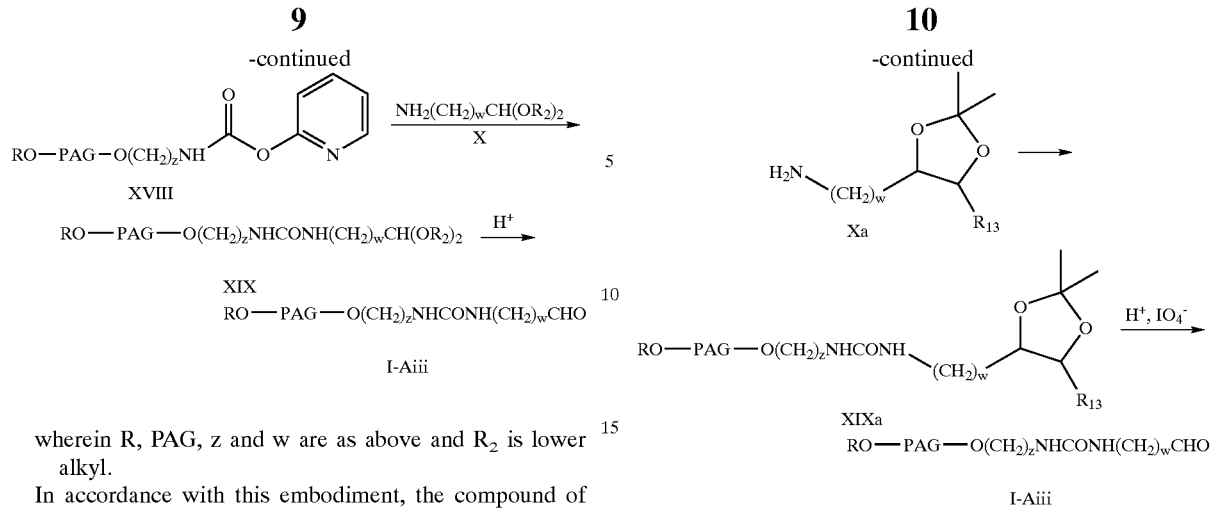

I-Aiii wherein R, PAG, z and w are as above and $R_2$ is lower alkyl.

In accordance with this embodiment, the compound of formula XVI is condensed with the compound of formula XVII in a halogenated hydrocarbon solvent to produce the compound of formula XVIII. This reaction utilizes conventional condensing procedures commonly used in reactions between an activated carbonate and an amine. The compound of formula XVIII is condensed with the amine of formula X in an inert organic solvent to produce the acetal of formula XIX. Any conventional inert organic solvent can be used in this reaction. The acetal of formula XIX is then hydrolyzed in acidic medium, in the manner described hereinabove to produce the compound of formula I-Aiii.

In the same manner described in the alternate synthesis of I-Ai, the compound of formula Xa is reacted with the carbamate XVIII to produce the compound of formula XIXa which is then hydrolyzed and oxidized to give the aldehyde I-Aiii.

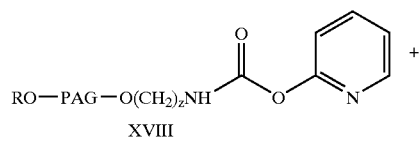

XVIII wherein R, PAG, z and w are as above, OL is a leaving group, and $R_{13}$ is hydrogen, alkyl, or phenyl.

The preparation of the compounds of the type Xa where $R_{13}$ is hydrogen has been described for w=2 (Petrov et al., Zh. Obshch. Khim. 1962, 32, 3720), w=3 (Olsen et al., J. Org. Chem. 1985, 50, 896) and w=4 (Timofeev et al., Nucleic Acids Res. 1996, 24, 3142).

In the compound of formula IA where m is 1, Y is —NH— and X is —O— the compound has the following formula:

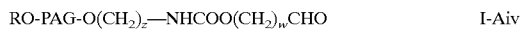

RO-PAG-O(CH$_2$)$_z$—NHCOO(CH$_2$)$_w$CHO      I-Aiv wherein R, PAG, and w are as above, and z is an integer of from 2 to 4

The compound of formula I-Aiv can be prepared as described by the following reaction scheme:

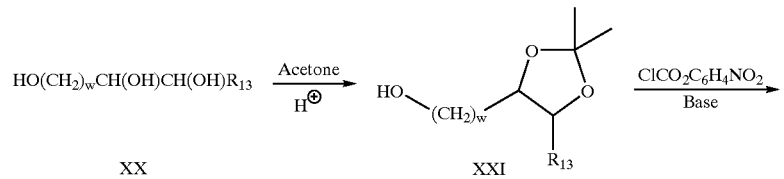

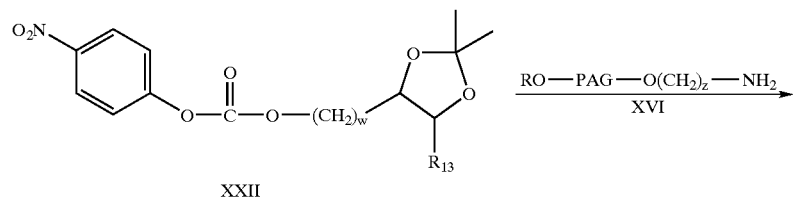

-continued

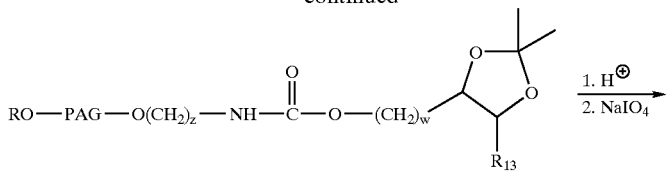

XXIII

I-Aiv wherein R, $R_{13}$, PAG, z and w are as above.

In this reaction, the starting material of formula XX is a tri-hydroxy compound having a terminal primary hydroxy group which is separated by at least two carbon atoms from two other hydroxy groups that are vicinal to each other. The compound of formula XX is converted to its acetonide derivative of formula XXI by reacting the two vicinal hydroxy groups with acetone leaving free the third hydroxy group. Any conventional method of forming an acetonide derivative from the two vicinal hydroxy groups can be utilized to carry out this reaction to form the compound of formula XXI. Reagents other than acetone, which are known to form cyclic acetals with 1,2-diols, may also be used. The free hydroxy group in the acetonide derivative of formula XXI is then activated with an activating group such as the p-nitro phenyl chloro formate as is shown in the reaction scheme. This reaction to convert the hydroxy group into an activated derivative is well known in the art. In this manner, the compound of formula XXII is produced where the primary hydroxy group on the compound of formula XXI is activated. The compound of formula XXII is then condensed with the PEG amine of formula XVI to form the condensation product of formula XXIII. Any conditions conventional in reacting an activated alcohol with an amine to produce a urethane can be utilized to carry out this condensation. The compound of formula XXIII containing the acetonide is then cleaved utilizing conditions conventional in cleaving acetonides such as by treatment with a mild acid, to produce the corresponding di-hydroxy compound. The resulting dihydroxy groups are then oxidized with mild oxidizing agents such as a periodate oxidizing agent to produce the aldehyde of formula I-Aiv. Any conventional method of oxidizing a vicinal di-hydroxy compound to the corresponding aldehyde can be utilized to carry out this conversion.

The compound of formula IB is synthesized from RO-PEG-OR by reaction with acrylic acid as described by the following reaction scheme:

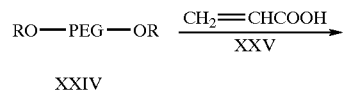

XXIV

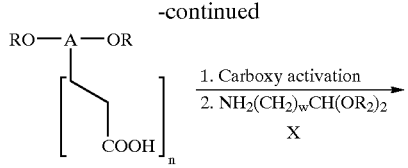

XXVI

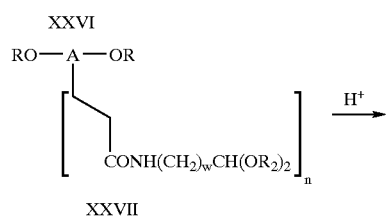

XXVII

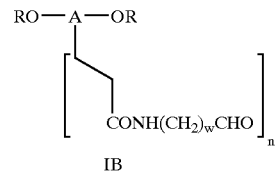

IB wherein A, R, w, n and $R_2$ are as above.

The acrylic acid of formula XXV can be reacted with the polyethylene glycol polymer of formula XXIV in the manner disclosed in U.S. Pat. No. 4,528,334 to Knopf, et al., to produce the compound of formula XXVI. The addition of acrylic acid across the various polyethylene glycol units in the series of polyethylene glycol residues designated A can be controlled so that from 1 to 5 bonds with the acrylic acid will take place to form the acrylic acid graft copolymer of formula XXVI. In this manner depending upon the conditions used, as disclosed in U.S. Pat. No. 4,528,334, from 1 to 5 additions of acrylic acid will occur in the polyethyleneoxy chain. In accordance with this invention, an activated form of the carboxy group of the graft copolymer of formula XXVI is reacted with the compound of formula X to form the compound of formula XXVII via amide formation. This reaction is carried out in the same manner as described hereinbefore in connection with the conversion of the compound of formula VIII to the compound of formula XI by reaction of the compound of formula X, through the use of an appropriate carboxy activating leaving group as in formula IX. By the procedure described in connection with the conversion of the acetal of XI to the aldehyde of formula I-Ai, the acetal of formula XXVII was converted to the derivative IB. The compound of formula IC can be prepared as shown by the following reaction scheme:

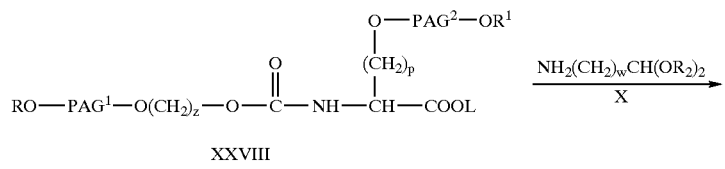

XXVIII

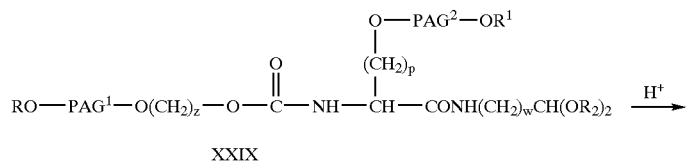

XXIX

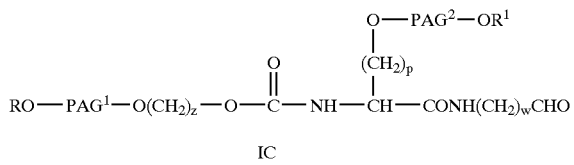

IC wherein R, $R_2$, $R^1$, $PAG^1$, $PAG^2$, OL, p, and w are as above, and z is an integer of from 2 to 4.

The derivative of formula IC is prepared from a compound of formula XXVIII in which there is an activated carboxyl group. This carboxyl group can be activated in the manner disclosed hereinbefore with respect to the activation of the compound of the formula VIII to produce the compound of the formula IX. The activated compound is then condensed with the amino acetal compound of formula X to produce the compound of formula XXIX in the same manner as described hereinbefore in connection with the reaction of the compound of formula IX with the compound of formula X to produce the compound of formula XI. The compound of formula XXIX is next converted to the compound of the formula IC by acid hydrolysis as described herein before in connection with the preparation of the compound of formula I-Ai from compound XI.

In the same manner described in the alternate synthesis of I-Ai, the compound of formula Xa is reacted with the derivative XXVIII to produce the compound of formula XXIXa which is then hydrolyzed and oxidized to give the aldehyde IC.

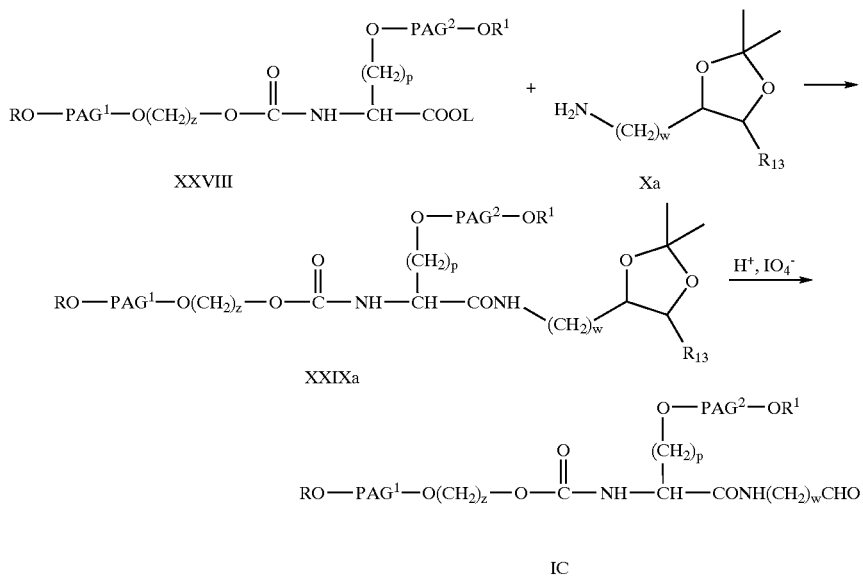

wherein R, R¹, PAG¹, PAG², $R_{13}$, OL, p, w and z are as above.

The compound of formula ID is produced from a compound of the formula XII as

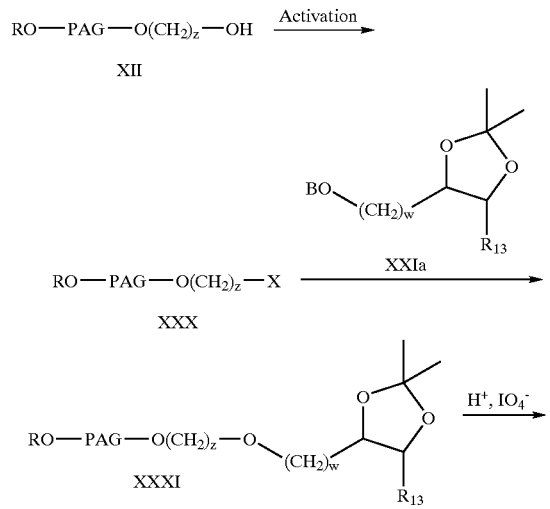

described by the following reaction scheme:

wherein R, $R_{13}$, PAG, and w are as above, X may be a halogen or sulfonate ester, B is an alkalai metal and z is an integer of from 2 to 4.

In carrying out this process the compound of formula XII is converted to the compound of formula XXX by converting the hydroxy group on the compound of formula XII to an activating leaving group. The conversion of the terminal hydroxyl group of compound XII into an activated halide leaving group X, can be readily achieved by reaction with a conventional halogenating reagent such as thionyl bromide. On the other hand where leaving groups, other than halides, are utilized, the hydroxy group of the compound of formula XII may be converted to a sulfonate ester by reaction with a halide of the activating leaving group such as mesyl or tosyl chloride. Any conventional method for converting the hydroxy group of compound XII to an activating leaving group such as a tosylate or mesylate or any of the aforementioned leaving groups can be utilized to produce the compound of formula XXX. This reaction may be carried out by reacting the formula XII with a halide of an activating leaving group such as tosyl chloride. The compound of formula XXX can then be condensed with the alkoxide of formula XXIa to form the compound of formula XXXI. In this case the acetonide group is a precursor to the aldehyde of formula ID. In the case shown in the above reaction scheme where an acetonide is used, the acetonide can be hydrolyzed in mild acid. However any conventional means to produce the resulting dihydroxy compound from an acetonide can be used in this conversion. The dihydroxy compound resulting form this hydrolysis can then be oxidized with a periodate to give the aldehyde of formula ID. This aldehyde can be reacted as set forth in Scheme 1 with a protein at the N-terminal amino acid to form the conjugate of the compound of formula IIID as described hereinbefore.

The compound of formula ID can also be produced from a compound of the formula XXI via the following reaction scheme:

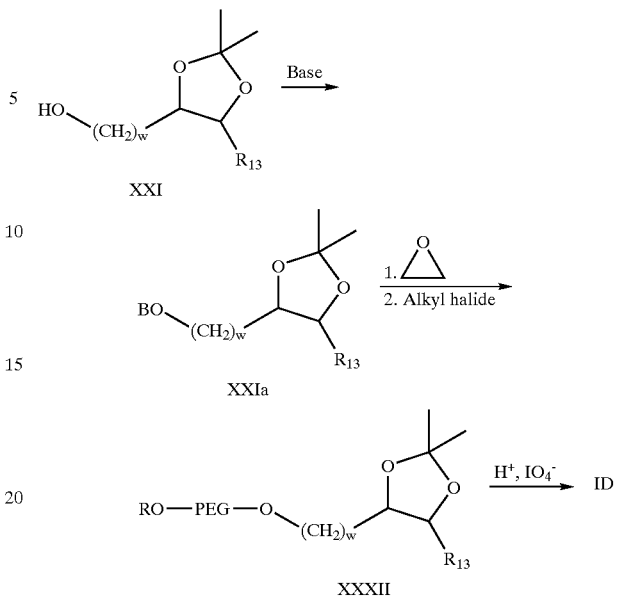

wherein R, $R_{13}$, and w are as above, PEG is a divalent residue of polyethylene glycol resulting from removal of the terminal hydroxy groups, having a molecular weight of from 1,000 to 100,000 Daltons.

In this reaction process, the compound of formula XXI is reacted with any conventional organic alkali metal base such as potassium naphthalide to form the corresponding alkoxide XXIa. Liquid ethylene oxide is then added under conventional polymeric conditions to a solution of XXIa. In this manner the anionic ring opening and polymerization of ethylene oxide is allowed to proceed under conditions that are well known for the production of polyethylene glycol polymers. In addition, the amount of polymerization of the ethylene oxide can be controlled by conventional means to produce a polyethylene polymer of any desired molecular weight. Any remaining ethylene oxide is then removed from the reaction mixture. Reaction for several hours, with an excess of an alkyl halide such as methyl iodide, results in the formation of a terminal alkyl ether. The product, the compound of formula XXXII, may then be converted to a compound of the formula ID in the same manner as described hereinbefore for the conversion of the compound of formula XXXI to the compound of formula ID. The compounds of formula ID and their intermediates, are considered as new derivatives when w is an integer from 3 to 8.

The aldehydes of formula IA, IB, IC and ID can be conjugated as described herein before with various proteins through an amine group on the protein by the process of reductive amination as disclosed in U.S. Pat. No. 5,824,784 dated Oct. 20, 1998. By means of regulating the pH (i.e. from 5.5 to 7.5) the aldehydes in this invention may condense at the N-terminus amino group of a protein so as to obtain a monoconjugate derivative. In this manner, the pegylating reagents of IA, IB, IC and ID can from site specific mono-conjugates with the N-terminal amino group of various proteins thereby avoiding the necessity of employing extensive purification or separation techniques. On the other hand, if higher pH's from about 8.5 and above are utilized, the reductive amination procedure will also involve the various lysine amino groups which are available in the protein molecule. Among the preferred proteins for such conjugations are included G-CSF, GM-CSF, interferon-α, interferon-β, ☐ EPO and hemoglobin.

In accordance with this invention, when the embodiments of formula I-Ai, I-Aii, I-Aiii and I-Aiv are reacted with the proteins by reaction as shown in Scheme 1, the following compounds are respectively produced:

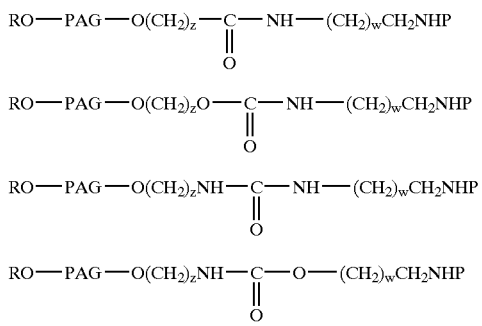

wherein P, R, PAG, z and w are as above.

The following examples are illustrative of the invention and are not to be construed as limiting the invention. In the following examples, the numbering as "1," etc. refers to the reaction scheme following the descriptive portions in each example.

EXAMPLES

Example 1

Scheme A (Type I-Ai)
Synthesis of mPEG-amide-propionaldehyde.

Methoxy PEG-OH (M.W. 20,000, n=452) 1 and potassium t-butoxide were dissolved in t-butyl alcohol and stirred at 60° C. Ethyl bromoacetate was then slowly added and the mixture stirred for another 15 hours at 80–85° C. After filtering the reaction mixture, the solvent was evaporated under reduced pressure. The residue was dissolved in distilled water, washed with diethyl ether, and extracted twice with dichloromethane. The dichloromethane solution was dried over magnesium sulfate and the solvent removed under vacuum. Precipitation was induced by the addition of diethyl ether to the crude residue and the precipitated compound was then filtered and dried under vacuum to give the product 2 as a white powder.

The mPEG-ethyl acetate was dissolved in 1 N-sodium hydroxide and stirred for 15 hours at room temperature. The reaction mixture was then adjusted to pH 2 with 1 N aqueous HCl and extracted twice with dichloromethane. The extracted organic layer was dried over magnesium sulfate and the organic solvent removed. Diethyl ether was then added to the residue and the precipitated compound filtered. The product was dried under vacuum and the resulting acid 3 obtained as a white powder.

To a solution of the mPEG-acetic acid 3 dissolved in dichloromethane and cooled to 0–5° C., was added N-hydroxysuccinimide followed by a solution of dicyclohexylcarbodimide in dichloromethane. The reaction mixture was stirred for 15 hours at room temperature. The by-product, dicyclohexylurea, was removed from the reaction mixture by filtration and the residual organic solvent evaporated. The crude residue was then recrystallized from ethyl acetate. The product was filtered, washed twice with diethyl ether, and dried for 12 hours under vacuum to afford the mPEG-succinimidyl acetate 4 as a white powder (see Example 2).

The mPEG-succinimidyl acetate 4 was dissolved in dichloromethane and stirred at room temperature while a solution of 1-amino-3, 3-diethoxypropane in dichloromethane was added. The resulting solution was then stirred for 2 hours at room temperature. Precipitation was induced by the addition of diethyl ether. The product was then filtered and recrystalized from ethyl acetate. The recrystalized compound was dried under vacuum to give 5 as a white powder.

The diethyl acetal 5 was dissolved in an aqueous solution containing phosphoric acid (pH1) and stirred for 2 hours at 40–50° C. After cooling the reaction mixture to room temperature, the acidity was reduced to a pH6 by the addition of a 5% aqueous sodium bicarbonate solution. Brine was added and the resulting mixture extracted twice with dichloromethane. The organic layer was dried over magnesium sulfate, filtered and the solvent evaporated under reduced pressure. Precipitation was induced by the addition of diethyl ether to the crude residue. The product was collected and dried under

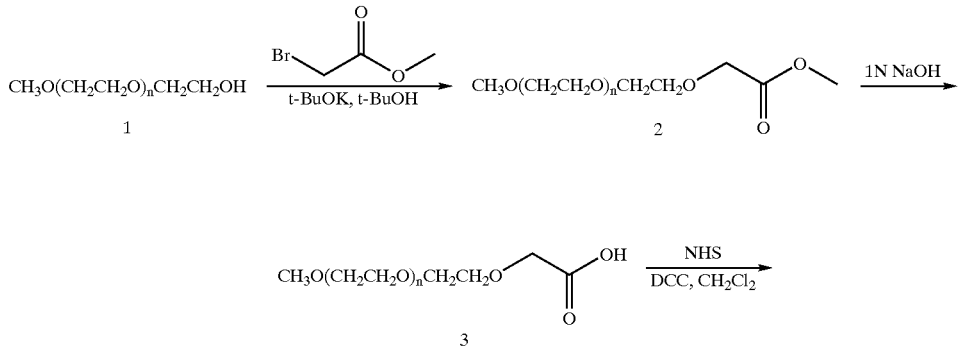

Scheme A

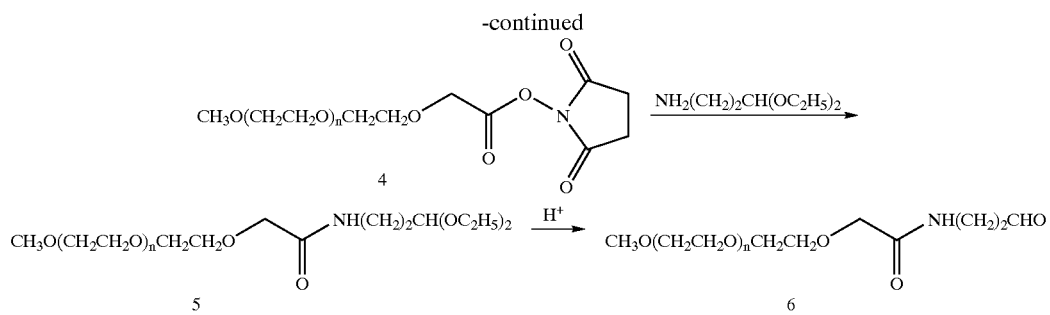

The integer n may be from 22 to 2,300 but more preferably 22 to 1,000. vacuum to give 6 as a white powder.

By using the same procedure, compounds of the type I-Ai can be prepared whereby the integer n may be from 22 to 2,300.

Example 2
Scheme B (Type I-Ai)
Synthesis of mPEG-amide-butyraldehyde

To 10 g, (1 mmol) of polyethylene glycol propionic acid 1, (MW 10,000, n=226) dissolved in a dry methylene 8 g of the acetal as a white solid. The acetal was then dissolved in 50 ml of 0.1M HCL and stirred at room temperature for 4 h to produce the amide aldehyde 4. The water was then removed under reduced pressure, and the crude amide-aldehyde product 4 purified by chromatography.

By using the same procedure, compounds of the type I-Ai can be prepared whereby the integer n may be from 22 to 2,300.

Scheme B

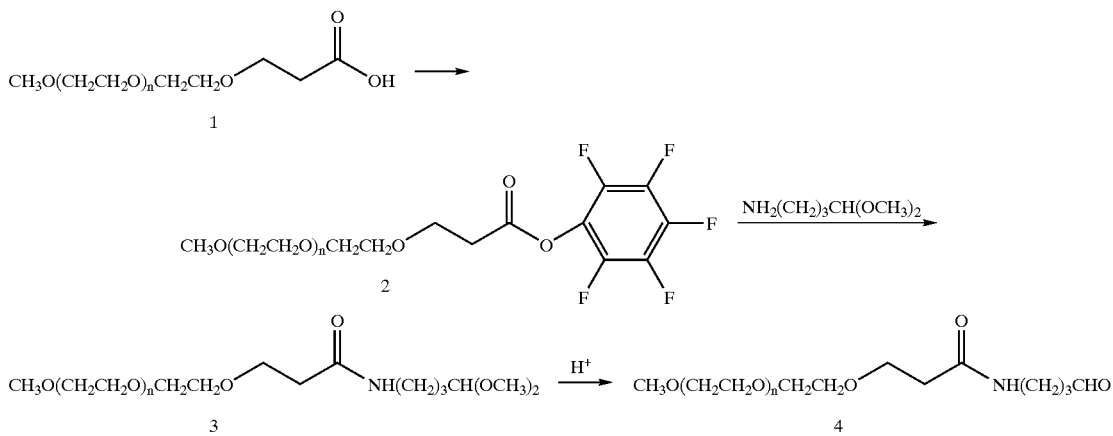

chloride/DMF solution (30 ml/30 ml) was added pyridine (5 mmol) and pentafluorophenyl trifluoroacetate (1.4 g, 5 mmol) and the reaction allowed to stir at room temperature for 45 minutes. The reaction was then diluted with 200 ml of methylene chloride and washed with 0.1N aqueous HCl (2×50 ml). The methylene chloride solution was then dried (MgSO$_4$) and most of the solvent removed under vacuum. The ester was then precipitated with diethyl ether.

To the pentafluorophenyl ester 2 (8.5 g~0.85 mmol) dissolved in dry methylene chloride (25 ml) there was added 1-amino-4,4-dimethoxybutane (0.33 g, 2.5 mmol). The reaction mixture was stirred at room temperature for 2 h and the product precipitated in ether (100 ml). After cooling to 4° C., the crude acetal of formula 3 was collected by filtration and then re-dissolved in a minimum of methylene chloride. The product was then precipitated by the addition of ether to give The integer n may be from 22 to 2,300 but more preferably 22 to 1,000.

Example 3
Scheme C (Type I-Aii)
Synthesis of mPEG-urethane-propionaldehyde.

Triphosgene (148 mg, 0.5 mmol) in 5 ml of dichloromethane was added slowly to a solution of 10 g of mPEG 1 (0.5 mmol) (MW 20,000, n=452)) dissolved in 30 ml of dichloromethane and the resulting mixture stirred for 15 hours at room temperature. The organic solvent was then removed under vacuum and the residue washed with dry ether and filtered. The acid chloride was then dissolved in 30 ml of dry dichloromethane and treated with 80 mg (0.7 mmol) of N-hydroxysuccinimide followed by triethylamine (71 mg, 0.1 ml). After 3 hours, the solution was filtered and evaporated to dryness. The residue was dissolved in warm (50° C.) ethyl acetate, and then the solution cooled to 0° C. The resulting precipitate 2 was collected as a white powder, and the product dried under vacuum.

To a solution of the 5 g (0.25 mmol) of mPEG-succinimidylcarbonate 2 dissolved in 30 ml of dichloromethane was added 1-amino-3,3-diethoxypropane (110 mg, 0.75 mmol). The reaction mixture was then stirred for 2 hours at room temperature. Ether was then added and the resulting precipitate collected and recrystalized from ethyl acetate. The product was washed twice with diethylether and dried under vacuum to give a as a white powder.

The diethyl acetal 3 (5 g) was dissolved in an aqueous solution containing phosphoric acid (pH1) and stirred for 2 hours at 40–50° C. After cooling the reaction mixture to room temperature, the acidity was reduced to a pH6 by the addition of a 5% aqueous sodium bicarbonate solution. Brine was added and the resulting mixture extracted twice with dichloromethane. The organic layer was dried over magnesium sulfate, filtered and the solvent evaporated under reduced pressure. Precipitation was induced by the addition of diethyl ether to the crude residue. The product was collected

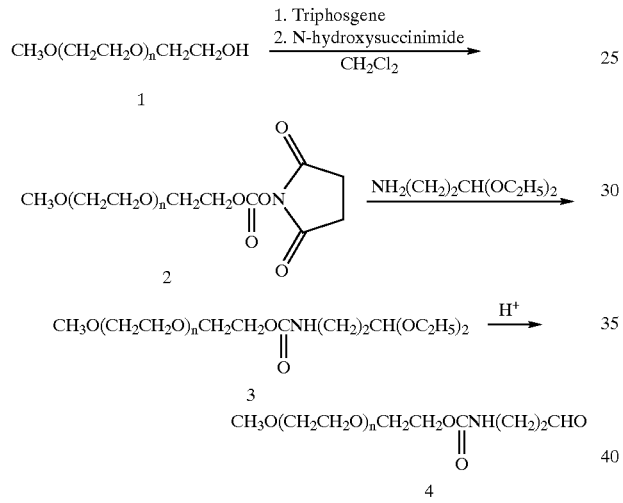

Scheme C and dried under vacuum to give 4 as a white powder. By using the same procedure, compounds of the type I-Aii can be prepared whereby the integer n may be from 22 to 2,300.

The integer n may be from 22 to 2,300 but more preferably 22 to 1,000.

Example 4

Scheme D (Type I-Aii)
Synthesis of mPEG-urethane-butyraldehyde.

To a solution of 201.6 mg (1 mmol) of 4-nitrophenyl chloroformate and 118.6 mg (0.97 mmol) of 4-dimethylaminopyridine dissolved in 10 ml of dry methylene chloride was added dropwise a solution of 9.7 g (0.97 mmol) of mPEG 1 (MW 10,000, n=225) dissolved in 50 ml of methylene chloride. After stirring for 1 h at room temperature, 172.8 mg (1.17 mmol) of 1-amino-4,4-dimethoxybutane was then added to the solution of the 4-nitrophenyl carbonate derivative 2. Stirring was continued for 20 h after which time the product 3 was precipitated by the addition of ether (100 ml).

After cooling to 4° C., the crude acetal of formula 3 was collected by filtration and precipitated twice with ether from a methylene chloride solution to give 8 g of the acetal as a white solid. The acetal was then dissolved in 50 ml of 0.1M HCL and stirred at room temperature for 4 h. The water was then removed under reduced pressure, and the crude urethane-aldehyde 4 purified by chromatography.

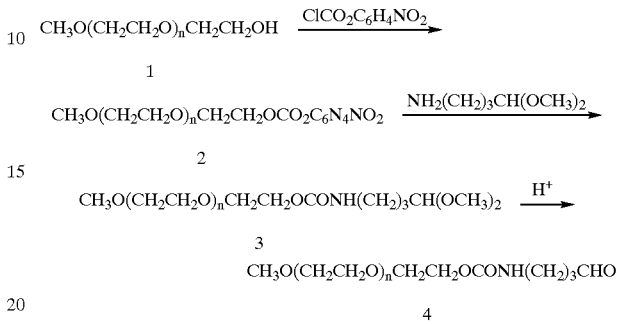

Scheme D

By using the same procedure, compounds of the type I-Aii can be prepared whereby the integer n may be from 22 to 2,300.

The integer n may be from 22 to 2,300 but more preferably 22 to 1,000.

Example 5

Scheme E (Type I-Aiii)

Synthesis of mPEG-urea-propionaldehyde.

To a solution of 2 g (0.2 mmol) of alpha-(2-aminoethyl)-omega-methoxypoly(oxy-ethanediyl) (MW 10,000, n=226) of formula 1 in 40 ml of dry methylene chloride, was added at 0° C., 65 mg (0.3 mmol) of di-2-pyridyl carbonate 2 and the mixture stirred for 5 h. The carbamate 3 was then precipitated by the addition of 100 ml of ether, filtered, and then washed with an additional 100 ml of ether. Drying under vacuum under a slow stream of nitrogen afforded 1.9 g of product as a white powder. To the resulting urethane intermediate (1.5 g~1.5 mmol) dissolved in dry methylene chloride (25 ml) was added 0.6 g (~4 mmol) of 1-amino-3,3-diethoxypropane. The reaction mixture was stirred at room temperature for 12 h and the acetal of formula 4 precipitated from ether (100 ml). After cooling to 4° C. the crude acetal was collected by filtration and precipitated twice from methylene chloride by addition of ether to obtain 1.1 g of the acetal as a white solid. The acetal was then dissolved in 50 ml of 0.1M HCL and stirred at room temperature for 4 h. The water was then removed under reduced pressure, and the crude urea-aldehyde product of formula 5 was purified by chromatography (the use of reagent 3 for urea formation, see U.S. Pat. No. 5,539,063).

By using the same procedure, compounds of the type I-Aiii can be prepared whereby the integer n may be from 22 to 2,300.

Scheme F

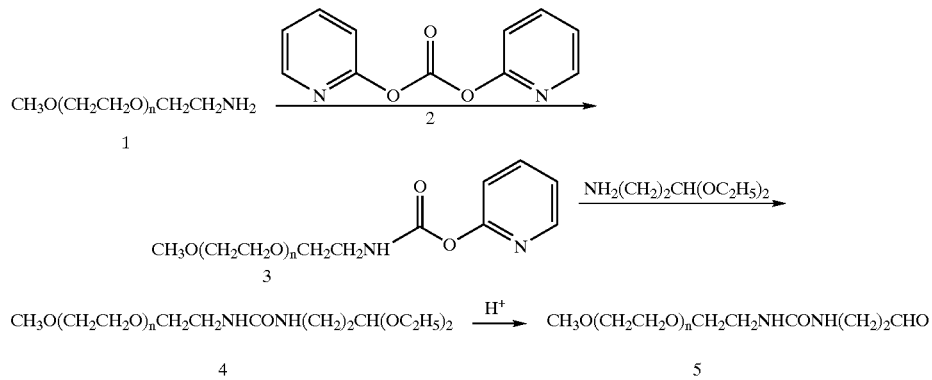

The integer n may be from 22 to 2,300 but more preferably 22 to 1,000.

Example 6

Scheme F (Type I-Aiv)
Synthesis of mPEG-urethane-butyraldehyde.

A mixture of pentane-1,2,5-triol 1 (11.7 g, 97.5 mmol) and toluene-p-sulfonic acid (0.3 g) in acetone-light petroleum ether (bp 40–60) (1:1 60 ml) was refluxed 24 h with a Dean-Stark apparatus. The solvent was then removed under vacuum and the residue dissolved in ether. The ethereal solution was washed with aqueous sodium carbonate, dried ($Na_2CO_3$) and the ether removed. The resulting oil was then distilled to give 10.7 g of the 1,3-dioxolane-2,2-dimethyl-4-propanol of formula 2 bp. 117–118, 12 mm. (Golding et al., (1978) J. C. S. Perkin II, 839).

To a solution of 11.2 g (55 mmol) of 4-nitrophenyl chloroformate in 100 ml of acetonitrile was added slowly 7.3 g (60 mmol) of 4-dimethylaminopyridine followed by 8 g (50 mmol) of the above acetonide product 2 dissolved in 20 ml of acetonitrile. After stirring for 24 h, the precipitated pyridinium hydrochloride was filtered and the solvent removed under reduced pressure. The residue was then dissolved in 200 ml of ether and washed with a 5% aqueous solution of sodium bicarbonate. The ether solution was then dried ($Na_2CO_3$) and the solvent removed under vacuum to give 16 g of the acetonide of formula 3.

To a solution of 6 g (0.6 mmol) of alpha-(2-aminoethyl)-omega-methoxypoly(oxy-ethanediyl) (MW 10,000, n=226) of formula 4 in 40 ml of dry methylene chloride, was added at 0° C., 600 mg (1.8 mmol) of the 4-nitrophenyl carbonate of formula 3 and 222 mg of 4-dimethylaminopyridine. The solution was stirred for 24 h after which time the compound of formula 5 was precipitated by the addition of 150 ml of ether. This product was filtered and further washed with ether to give 5 g of the urethane-acetonide of formula 5 as a white solid.

Compound 5 (5 g, 0.5 mmol) was then dissolved in 75 ml of 0.1M HCl and stirred for 6 h. The water and HCl were then removed under reduced pressure to give the corresponding diol product. To 5 g of the diol dissolved in 75 ml water was added 267 mg of $NaIO_4$ (1.25 mmol) and the reaction allowed to proceed for 5 h in the dark. The aldehyde of formula 6 was then isolated by size exclusion chromatography on a Sephadex G 10 column. Oxidation of the 1,2-diol may also be realized using $NaIO_4$ supported on wet silica gel. Using this procedure the aldehyde is obtained without hydrate formation. (see Vo-Quang et al., (1989) Synthesis No.1,64).

By using the same procedure, compounds of the type I-Aiv can be prepared whereby the integer n may be from 22 to 2,300

Scheme F

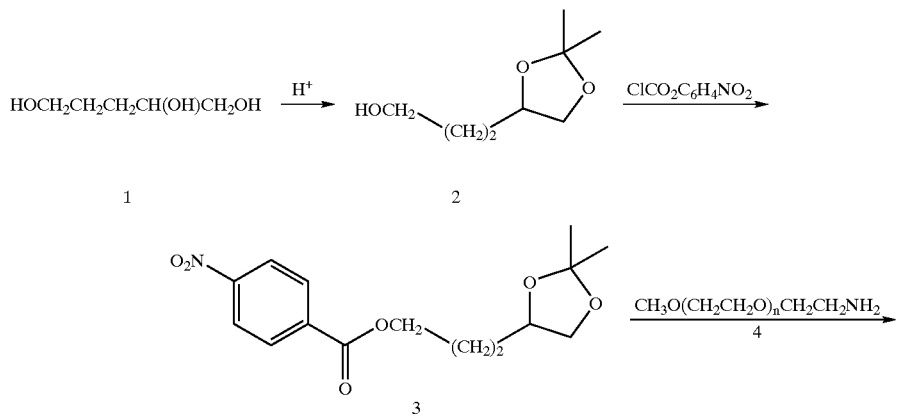

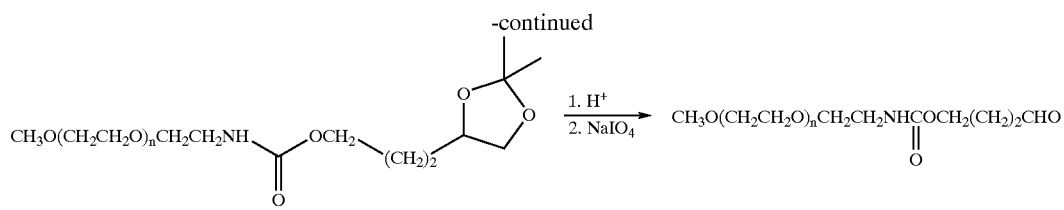

Example 7
Scheme G (Type IB)
Synthesis of Pendant mPEG-urethane-propionaldehyde.

Nonane was added to a reaction vessel containing mPEG (M.W. 20,000), and heated to 140–145° C. When the solid melted, acrylic acid and t-butyl peroxybenzoate (a reaction initiator) were slowly added to the reaction mixture over a period of 1.5 hours. After the addition, the mixture was stirred for an additional hour at 140–145° C. After the removal of residual nonane from the reaction mixture by evaporation, methanol was added to the mixture and heated and stirred until a homogeneous solution was obtained. The hot solution was then filtered under vacuum and the filtrate diluted with a go/10/, v/v, MeOH/$H_2O$ solution. The resulting mixture was then filtered through a Pall Filtron ultrafiltration system and the filtrate then concentrated under reduced pressure. The residue was dissolved by heating with a 50/50, v/v, acetone/isopropyl alcohol solution, cooled to room temperature, and placed in the refrigerator overnight. The product 1 was then filtered, washed 3 times with 50/50, v/v, acetone/isopropyl alcohol solution and finally 3 times with diethyl ether and then vacuum dried overnight. The acid number of the pendant-PEG-propionic acid 1 was determined by titration (mg of KOH needed to neutralize one gram of sample).

The pendant-PEG-propionic acid 1 was dissolved in dichloromethane and cooled to 0–5° C. N-hydroxysuccinimide was then added followed by the addition of dicyclohexylcarbodimide dissolved in chloromethane. After stirring for 15 hours at room temperature, the dicyclohexylurea by product was removed from the reaction mixture by filtration and the residual organic solvent evaporated under vacuum. The crude residue was recrystalized from ethyl acetate, filtered, washed twice with diethyl ether, and dried for 12 hours under vacuum to give the pendant PEG-succinimidyl propionate 2 as a white powder.

To a solution of the pendant PEG-succinimidyl propionate 2 dissolved in dichloromethane was added at room temperature 1-amino-3,3-diethoxypropane and the resulting solution stirred for 2 hours. Precipitation was induced by the addition of diethyl ether and the product so obtained recrystalized from ethyl acetate. The recrystalized compound was filtered, washed twice with diethyl ether, and dried for 12 hours under vacuum to give the pendant-PEG-propoionaldehyde diethylacetal 3 as a white powder.

The pendant-PEG-propionaldehyde diethyl acetal 3 was dissolved in an aqueous solution containing phosphoric acid (pH 1) and stirred for 2 hours at 40–50° C. After cooling the reaction mixture to room temperature, the acidity was reduced to a pH6 by the addition of a 5% aqueous sodium bicarbonate solution. Brine was added and the resulting mixture extracted twice with dichloromethane. The organic layer was dried over magnesium sulfate, filtered and the solvent evaporated under reduced pressure. Precipitation was induced by the addition of diethyl ether to the crude residue. The product was collected and dried under vacuum to give the pendant PEG-amide propionaldehyde 4 as a white powder.

By using the same procedure, compounds of the type IB can be prepared whereby the integer m may be from 22 to 2,300

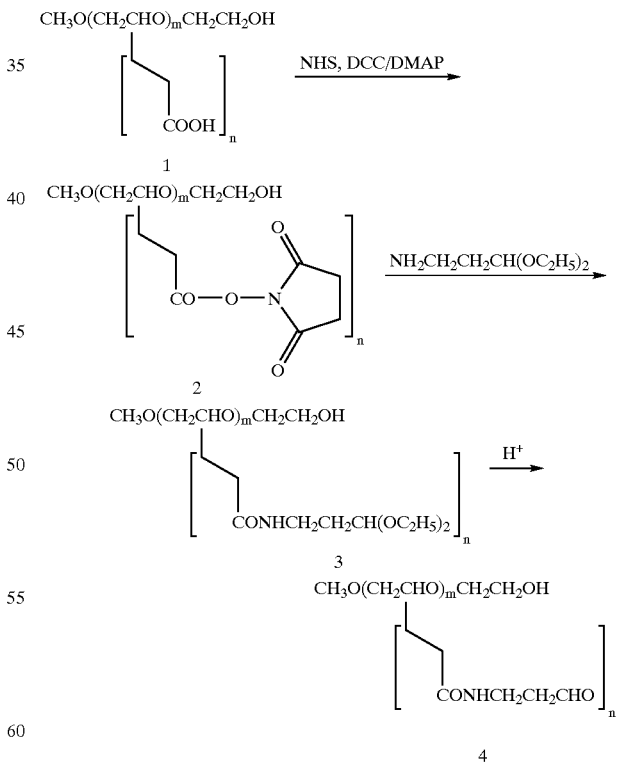

The integer m may be from 22 to 2,300 but more preferably 22 to 1,000. The integer n may be 1 to 20 and more preferably 1 to 5.

Example 8

Scheme H (Type IC)
Synthesis of Branched mPEG-amide-propionaldehyde.

The conversion of the branched chain carboxy acid 1 to the corresponding propionaldehyde 2 was carried out in the same manner as described in Example 2.

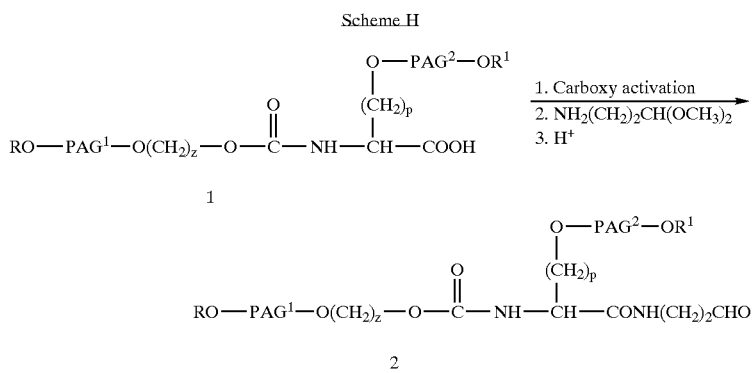

wherein R, $R^1$, $PAG^1$, $PAG^2$, p and z are as above.

Example 9

Scheme I (Type IC)
Synthesis of Branched mPEG-amide-butyraldehyde.

The conversion of the branched chain carboxy acid 1 to the corresponding butyraldehyde 2 was carried out in the same manner as described in Example 2.

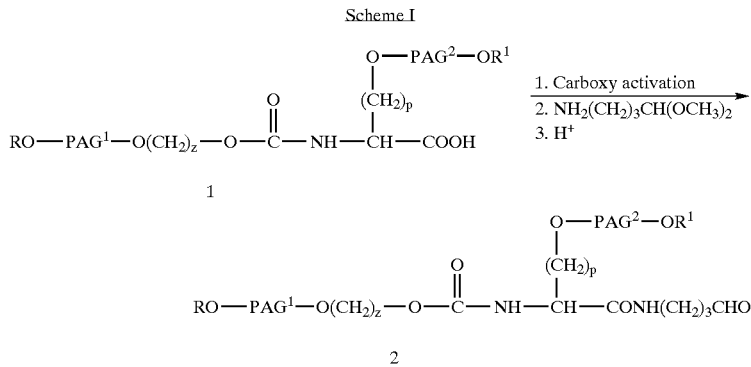

wherein R, $R^1$, $PAG^1$, $PAG^2$, p and z are as above.

Example 10

Scheme J (Type ID)
Synthesis of mPEG-Butyraldehyde.

A mixture of pentane-1,2,5-triol of formula 1 (11.7 g, 97.5 mmol) and toluene-p-sulfonic acid (0.3 g) in acetone-light petroleum ether (bp 40–60) (1:1 60 ml) was refluxed 24 h with a Dean-Stark apparatus. The solvent was then removed under vacuum and the residue dissolved in ether. The ethereal solution was then washed with aqueous sodium carbonate, dried ($Na_2CO_3$) and the ether removed. The resulting oil was then distilled to give 10.7 g of 1,3 dioxolane-2,2-dimethyl-4-propanol of formula 2 bp. 117–118, 12 mm. (Golding et al., (1978) J. C. S. Perkin II, 839).

To a solution of 6 g (0.6 mmol) of mPEG alcohol (MW 10,000, n=226) in 40 ml of dry methylene chloride, was added at –10° C., 182 mg (0.26 ml) of trimethylamine and toluene-p-sulfonyl chloride (381 mg, 2 mmol). The cooling was removed and the mixture stirred at room temperature for 18 h. The product was precipitated by the addition of 150 ml of ether, filtered and further washed with ether to give 5 g of the PEG tosylate 3 as a white solid.

A solution of 320 mg (2.0 mmol) of 1,3-dioxolane-2,2-dimethyl-4-propanol 2 dissolved in 10 ml of dry dioxane was added dropwise under nitrogen to a mixture of 100 mg of sodium hydride suspended in 5 ml of benzene. The mixture was then stirred for 30 min to give the sodium alkoxide salt of 2. To this solution was then added dropwise over a 20-min period, a solution of 4 g (0.4 mmol) of the PEG tosylate 3 dissolved in 30 ml of dioxane. The reaction mixture was then stirred for 24 h at 40° C. and then added dropwise to 150 ml of ether to precipitate the compound of formula 4 as a white solid. This material was then purified by chromatography on a small alumina column.

The PEG acetonide 4 (3.5 g) was dissolved in 40 ml of 0.1M HCl and stirred for 6 h. The water and HCl were then removed under reduced pressure to give the corresponding diol product. To 3 g of the 1,2-diol dissolved in 40 ml water (~0.3 mmol of diol) was added 160 mg of $NaIO_4$ (0.75 mmol) and the reaction allowed to proceed for 5 h in the dark. The PEG butyraldehyde 5 was isolated by size exclusion chromatography on a Sephadex G 10 column.

Scheme I

HOCH$_2$(CH$_2$)$_2$CH(OH)CH$_2$OH $\xrightarrow{\text{Acetone}}{\text{H}^\oplus}$

1

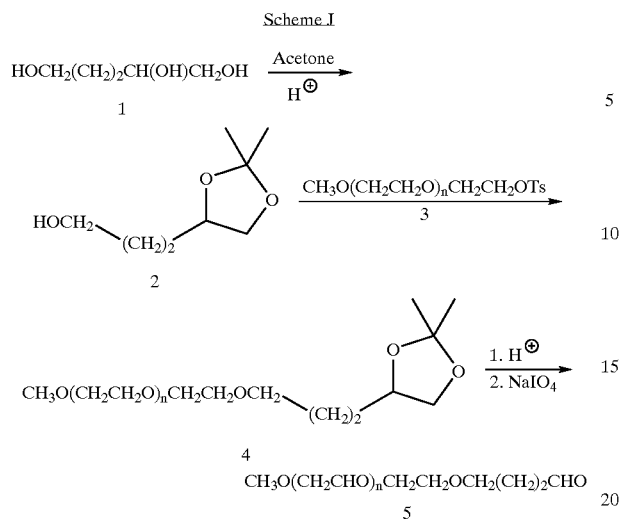

2

$\xrightarrow{\text{CH}_3\text{O(CH}_2\text{CH}_2\text{O)}_n\text{CH}_2\text{CH}_2\text{OTs}}$
3

CH$_3$O(CH$_2$CH$_2$O)$_n$CH$_2$CH$_2$OCH$_2$— 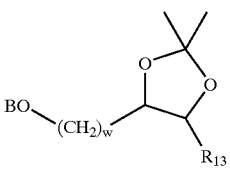 $\xrightarrow{\begin{array}{l}1.\ \text{H}^\oplus\\2.\ \text{NaIO}_4\end{array}}$

4

CH$_3$O(CH$_2$CHO)$_n$CH$_2$CH$_2$OCH$_2$(CH$_2$)$_2$CHO
5

By using the same procedure, compounds of the type ID can be prepared whereby the integer m may be from 22 to 2,300.

The integer n may be from 22 to 2,300 but more preferably 22 to 1,000.

What is claimed is:

1. A process for producing an aldehyde of the formula

RO-PAG-O—(CH$_2$)$_z$—O—(CH$_2$)$_w$—CHO wherein R is lower alkyl, PAG is a divalent residue of polyalkylene glycol resulting from removal of the terminal hydroxy groups, having a molecular weight of from 1,000 to 100,000 Daltons, z is an integer of from 2 to 4, and w is an integer of from 2 to 8;

from a hydroxy compound of the formula

RO-PAG-O—(CH$_2$)$_z$—OH wherein R, PAG are as above, and z is an integer of from 2 to 4; comprising esterifying said hydroxy compound to form an ester of the formula RO-PAG-O—(CH$_2$)$_z$—OL wherein R and PAG are as above and OL is a sulfonic acid ester;

by reacting said hydroxy compound with a sulfonating agent having the formula

HaloL wherein L is a sulfonyl leaving group and Halo is a halogen;

to form said sulfonate ester, and reacting said ester with an acetonide of the formula

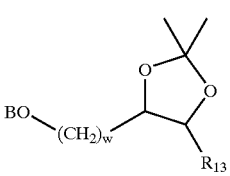

wherein R$_{13}$ is hydrogen, alkyl, or phenyl, w is as above and B is an alkali metal;

to form a polymeric acetonide of the formula

RO—PAG—O—(CH$_2$)$_z$—O—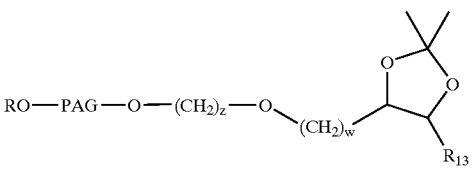

wherein R, PAG, R$_{13}$, z and w are as above;
and thereafter hydrolyzing said polymeric acetonide under acid conditions to remove the acetonide group, and thereafter subjecting said hydrolyzed acetonide to oxidation with a periodate oxidizing agent to form said aldehyde.

2. A process for producing an aldehyde of the formula

RO-PAG-O—(CH$_2$)$_z$—O—(CH$_2$)$_w$—CHO wherein R is lower alkyl, PAG is a divalent residue of polyalkylene glycol resulting from removal of the terminal hydroxy groups, having a molecular weight of from 1,000 to 100,000 Daltons, z is an integer of from 2 to 4, and w is an integer of from 2 to 8;

from a hydroxy compound of the formula

RO-PAG-O—(CH$_2$)$_z$—OH wherein R, PAG and z are as above;

comprising halogenating said hydroxy compound to form a halide of the formula

RO-PAG-O—(CH$_2$)$_z$—X by reacting said hydroxy compound with a halogenating agent having the formula

X$_2$SO wherein X is a halogen;
to form said halide, and reacting said halide with an acetonide of the formula

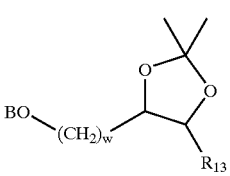

wherein R$_{13}$ is hydrogen, alkyl, or phenyl, w is as above and B is an alkali metal;

to form a polymeric acetonide of the formula

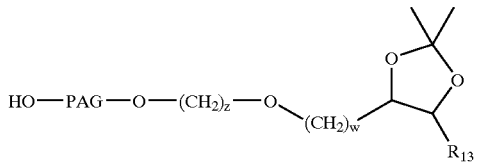

wherein R, $R_{13}$, PAG, z and w are as above;
and thereafter hydrolyzing said polymeric acetonide under acid conditions to remove the acetonide group, and thereafter subjecting said hydrolyzed acetonide to oxidation with a periodate oxidizing agent to form said aldehyde.

3. A process for producing an aldehyde of the formula

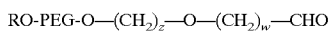

wherein PEG is a divalent residue of polyethylene glycol resulting from removal of the terminal hydroxy groups, having a molecular weight of from 1,000 to 100,000 Daltons, and w is an integer of from 2 to 8, and z is an integer of from 2 to 4.

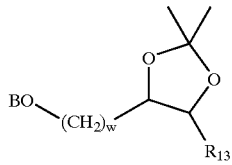

from an acetonide of the formula
wherein B is an alkali metal, and $R_{13}$ and w are as above;

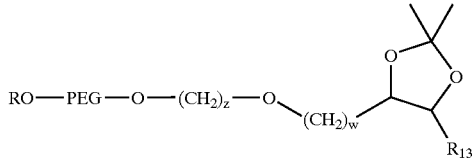

comprising reacting said acetonide with ethylene oxide by passing liquid ethylene oxide into an organic solution containing the acetonide under polymerization conditions to form the hydroxy acetonide compound of the formula wherein PEG, $R_{13}$, z and w are as above;

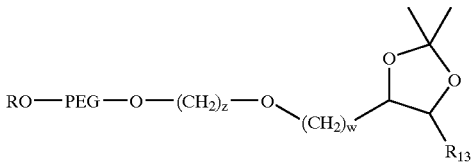

etherifying said hydroxy acetonide with a lower alkyl halide to form a polymeric acetonide of the formula
wherein R is lower alkyl, and PEG, $R_{13}$, z and w are as above;
and thereafter hydrolyzing said polymeric acetonide under acid conditions to remove the acetonide group, and thereafter subjecting said hydrolyzed acetonide to oxidation with a periodate oxidizing agent to form said aldehyde.

4. A process for producing an aldehyde of the formula

wherein PEG is a divalent residue of polyethylene glycol resulting from removal of the terminal hydroxy groups, having a molecular weight of from 1,000 to 100,000 Daltons, z is an integer of from 2 to 4, and w is an integer of from 2 to 8;
from a polymeric acetonide of the formula

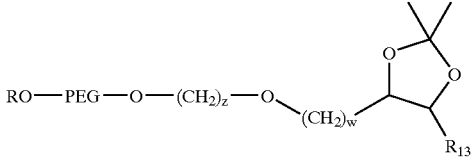

wherein R, PEG, $R_{13}$, z and w are as above;
and thereafter hydrolyzing said polymeric acetonide under acid conditions to remove the acetonide group, and thereafter subjecting said hydrolyzed acetonide to oxidation with a periodate oxidizing agent to form said aldehyde.

5. An aldehyde of the formula:
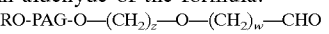

wherein R is lower alkyl, PAG is a divalent residue of polyalkylene glycol resulting from removal of the terminal hydroxy groups, having a molecular weight of from 1,000 to 100,000 Daltons, z is an integer of from 2 to 4, and w is an integer of from 2 to 8.

6. The aldehyde of claim 5 wherein said divalent residue is formed from polyethylene glycol.

7. The aldehyde of claim 6 wherein the residue has a molecular weight of 5,000 to 50,000 Daltons.

8. The aldehyde of claim 7 wherein R is methyl and said residue has a molecular weight of 20,000 Daltons.

* * * * *